United States Patent [19]

Grunder et al.

[11] 4,232,447
[45] Nov. 11, 1980

[54] METHOD AND AN APPARATUS FOR CONTINUOUSLY MONITORING THE CROSS-SECTION OF SLIVERS

[75] Inventors: Werner Grunder, Monchaltorf; Erwin Murbach, Werrikon-Uster, both of Switzerland

[73] Assignee: Zellweger Uster Limited, Switzerland

[21] Appl. No.: 4,879

[22] Filed: Jan. 19, 1979

[30] Foreign Application Priority Data

Feb. 2, 1978 [CH] Switzerland .................. 1130/78

[51] Int. Cl.³ .............................................. G01B 7/04
[52] U.S. Cl. ................................ 33/147 L; 33/149 J
[58] Field of Search .............. 33/147 L, 143 L, 148 R, 33/148 H, 149 R, 149 J

[56] References Cited

U.S. PATENT DOCUMENTS

| | | | |
|---|---|---|---|
| 1,133,300 | 3/1915 | McGauley | 33/148 H |
| 2,179,517 | 11/1939 | Pelosi | 33/148 H |
| 2,392,010 | 1/1946 | Stevens | 33/149 J |
| 2,858,614 | 11/1958 | Schuenemann | 33/148 H |
| 4,060,734 | 11/1977 | Tilley et al. | 33/147 L |
| 4,121,716 | 10/1978 | Luperti et al. | 33/143 L |
| 4,136,454 | 1/1979 | Jenkins et al. | 33/147 L |

Primary Examiner—Willis Little
Attorney, Agent, or Firm—Craig & Antonelli

[57] ABSTRACT

In the continuous measurement and control of deviations in cross-section of slivers with constant relative sensitivity which is independent of the adjusted set value with respect to this set value, the sliver is guided between a grooved roller and a feeler roller which contact each other in the absence of the sliver between the grooved roller and the feeler roller. The changes in the position of the feeler roller are converted into rotational movements of a lever shaft and thus into changes of direction of a measuring tab. The measuring tab is arranged eccentrically on the lever shaft.

A sensor is movable by means of a lead spindle which is perpendicular to the lever shaft and lies in a plane determined by the lever shaft and by the axis of the feeler roller in the absence of sliver between the rollers. This sensor preferably has a magneto-resistor. The changes in direction of the measuring tab are, therefore, transformed into fault signals of the magneto-resistor, the fault signals being used to control the thickness of the sliver.

11 Claims, 6 Drawing Figures

METHOD AND AN APPARATUS FOR CONTINUOUSLY MONITORING THE CROSS-SECTION OF SLIVERS

This invention relates to the continuous monitoring of the cross-section of slivers.

In order to measure and control products in the textile industry, especially slivers composed of various fiber materials, it is necessary continuously to measure the cross-section of the sliver and to deduce the required controlled variables from it.

Different ways of measuring the cross-section in this way have been used in the past with varying success. Mechanical, capacitive, optical and pneumatical systems are known.

Mechanically acting systems are based on the fact that the sliver is guided through a duct, preferably of rectangular cross-section, under constant pressure, so that the height of filling in the duct is directly proportional to the cross-sectional of the sliver when the width of the duct is constant. The measurement of this full height by mechanical or electro-mechanical arrangements is known per se. Both the requirement continuously to measure the sliver running through the duct and the need to detect relatively large ranges with uniform sensitivity formerly made the known methods of measuring the full height of a normal cross-section through the sliver awkward to use and inaccurate in evaluation.

Pneumatic measuring systems are based on the positive displacement of the air contained in the sliver when the sliver is pulled through a measuring funnel and the determination of the pressure produced during positive displacement. This system is extremely serviceable and its most impressive features are the simple manner in which a measuring funnel can be fitted between available machine components which are often close together, as well as the slight mechanical strain of the test material and the ability to use it at high sliver speed. Indeed, these advantages are only fully appreciated in the case of relatively fine fibers of relatively constant fiber fineness because the pressure values occurring are dependent on the respective fiber fineness of the sliver material.

Capacitive systems in which the sliver passes a plate capacitor and influences its capacitance are also known. These systems have various disadvantages. Thus, for example, the variability in the dielectric constants owing to the moisture of the fiber material as well as shape effects of the sliver cross-section and drifting of the zero point owing to amplification.

Finally, optical systems which emit a signal which approximately corresponds to the respective sliver cross-section either by absorption or by reflection of light should be mentioned. These systems do, however, also have various disadvantages which arise both from the optical system and from the different properties of the sliver material toward light breaking and light absorption. The above-mentioned pneumatic, capacitive or optical measuring systems can no longer be recommended, in particular for measuring devices which are provided for slivers made from coarse fiber material such as flax, linen, hemp, wool, coarse man-made fibers and the like. It is necessary to fall back on the known systems of measuring the full height of a passage of predetermined width by measuring the full height for such materials. Accordingly, an object of this invention is to find a method of, and apparatus for, measuring the full height in this way.

The present invention accordingly provides a method of continuously monitoring and controlling deviations in the cross-section of slivers having constant relative sensitivity which is independent with respect to an adjusted set value, by using a grooved roller and a feeler roller which cooperates with the grooved roller, the feeler roller being mounted so as to be displaceable under the influence of the sliver cross-section against a resistance force wherein changes in the position of the feeler roller are converted into a rotation of a lever shaft and result in movement of a measuring tab arranged eccentrically on the lever shaft, the movements of the measuring tab being detected without contact by means of a sensor and deviations of the measuring tab from a position representing the set value of the sliver cross-section being converted into proportional electrical error signals which control the sliver cross-section. The invention also provides an apparatus for carrying out this method, the apparatus comprising a grooved roller and a feeler roller that cooperates with the grooved roller and, that is displaceable against a resistance force under the influence of the sliver located between the grooved roller and the feeler roller, a lever shaft on which the feeler roller is eccentrically mounted, an eccentric measuring tab connected to the lever shaft and arranged to follow the rotational movements of the shaft, and a sensor which lies in a plane determined by the axis of the lever shaft and the axis of the feeler roller when no sliver is present and which is arranged to detect the position of the measuring tab without contact.

In this arrangement, the sensor can be displaced along a track which is perpendicular to the lever shaft and lies in a plane passing through the axis of the lever shaft as well as through the axis of the feeler roller when no sliver is present. The object is, therefore, to detect the point of intersection of the measuring tab arranged eccentrically on the lever shaft and the track of the sensor and to produce a control signal which is proportional to the deviation of the measuring tab from a selected point of intersection. Since the angular deflections of the lever shaft resulting from the thickness of the sliver lying in the grooved roller are only very small, attempts are to be made to increase these deflections so that they result in a good resolving power. This increase should, however, be made without mechanical articulations, or rods, which have to have bearing positions without clearance since they impair the reproducibility of the determination of position and thus impair the adjustment to the set number of the sliver.

The solution of this invention is particularly advantageous for this purpose since the track along which the sensor can be adjusted and the measuring tab located eccentrically on the lever shaft intersect at an acute angle, this point of intersection being shifted substantially along the guide track even in the case of small rotations of the lever shaft. If the eccentricity of the measuring tab is suitably calculated, any paths can be predetermined as a range for the shifting of the point of intersection, only the size of the apparatus provided setting a limit.

Another advantage of the invention is that it allows the requirement for a constant relative sensitivity for slivers with different numbers of filaments to be met with one and the same arrangement. Applied to the cross-sections of slivers, this means that, for example, a heavy sliver with a deviation in cross-section of 10% at least approximately resolves an equal error signal as a light sliver also having a deviation in cross-section of 10%. If the measuring tab is provided with a special curved shape, the sensitivity is absolutely constant over the entire numerical range.

When applied to the method according to the invention, this means that for a heavy sliver (marked filling of the grooved roller), the point of intersection along the sensor track at which the sensor is located should be in the vicinity of the lever shaft while for a light sliver (slight filling of the grooved roller), the point of intersection should be located at a position on the sensor track more remote from the lever shaft where small deflections of the lever shaft induce quite considerable shifts of the point of intersection.

So-called magneto-resistors which are known per se are advantageously used as sensors. They are eminently suitable owing to their small structure and large resolving power and also owing to a behaviour which is linear over a relatively large range, the emission of polarized fault signals depending upon the position of the measuring tab and as a result of the fact that the measuring tab, as a passive member, has no electrical function to fulfill. The sensitivity of the magneto-resistor to variations in temperature can be eliminated by suitable compensation circuits so that the fault signals are virtually constant under all operating conditions.

The invention will now be described with reference to the accompanying drawings in which:

FIG. 1 schematically illustrates the measuring principle of this invention;

Figure 5:
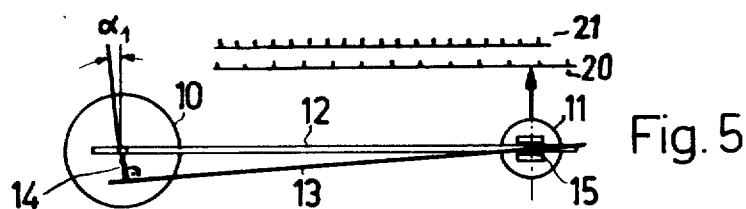
Figure 6:
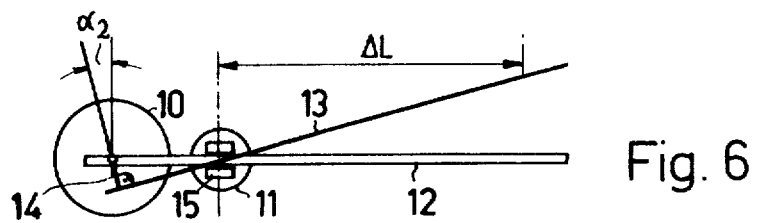

FIG. 5 diagrammatically illustrates a remotely lying magneto-resistor in the case of a small deflection of the lever shaft; and FIG. 6 illustrates a magneto-resistor which has been moved out in the case of large deflection of the lever shaft.

Figure 1:
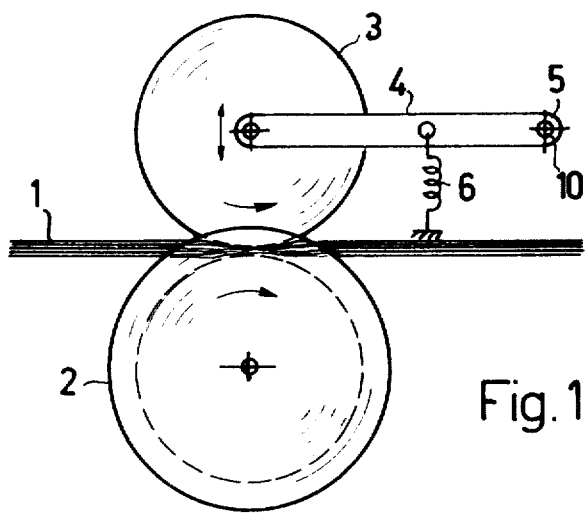

FIG. 1 shows the basic arrangement of a device for monitoring the thickness or cross-section of the sliver 1 by means of a grooved roller 2 and a feeler roller 3. The grooved roller 2 is rotatably mounted in a fixed position but the feeler roller 3 is rotatably mounted on a lever 4. This lever 4 is pivotal on a lever shaft 10 in a lever bearing 5 and is urged into a position in which the feeler roller is pressed into the bottom of the grooved roller 2, by a spring 6 or other biasing means. In this operation a sliver 1 is inserted in the bottom of the grooved roller 2. The feeler roller 3 is displaced upwards to a greater or lesser extent, depending on the respective thickness of the sliver or deviation from the set value. Accordingly, the object is to determine the value of this small or large displacement as accurately as possible and reproducibly.

In the method and apparatus of this invention, the angular rotation of the lever shaft 10 is measured and used to reproduce the variable lifting of the feeler roller 3 by the lever 4 on the lever shaft 10 located in the lever bearing 5. The length of the lever 4 will obviously influence the value of the angular rotation of the lever shaft 10.

Figure 2:
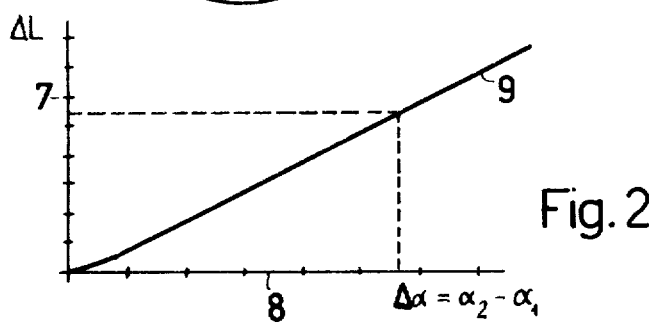
FIG. 2 is a graph illustrating the dependence of the position of a point of intersection upon a rotational angle.

FIG. 2 is a graph in which a line 9 illustrates the relationship between the angular rotation $\Delta\alpha$, which is indicated on the abscissa 8 and which is covered by the lever shaft 10 and longitudinal displacement $\Delta L$, the scale of which is given by the ordinate 7. It is advantageous for the field of application intended for the invention if the line 9 is a straight line over a region which is as wide as possible and this means that an angular value is converted exactly proportionately into a length.

Figure 3:
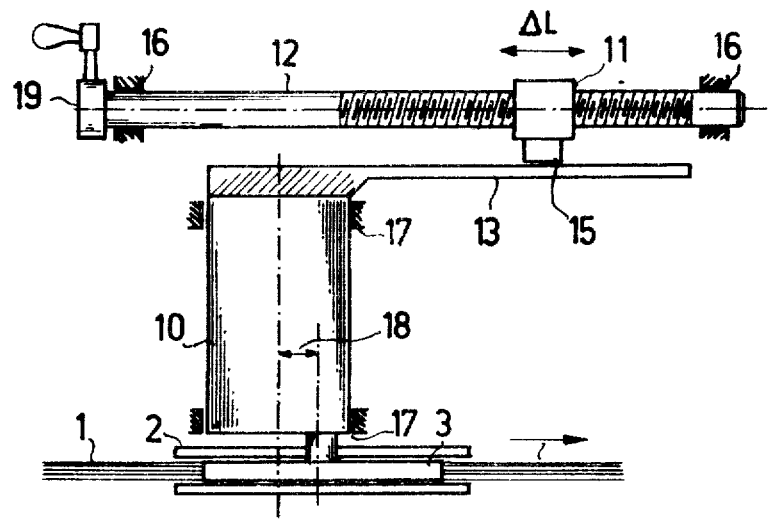
FIG. 3 illustrates the plan view of a preferred embodiment.
Figure 4:
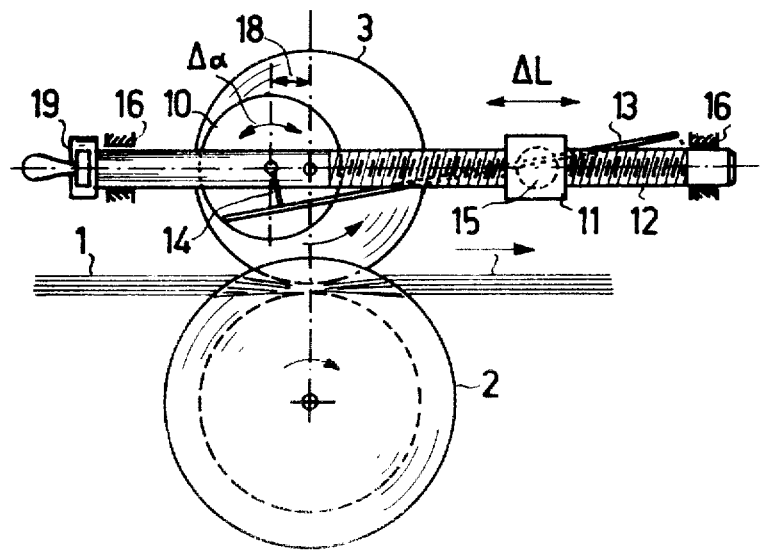
FIG. 4 is a front view of the same embodiment shown in FIG. 3.

FIG. 3 is a plan view and FIG. 4 is a front view of an embodiment of the feeler roller 3, the grooved roller 2 and the sliver 1. The feeler roller 3 is mounted with respect to the lever shaft 10 at a distance or eccentricity 18. This eccentricity 18 corresponds to the length of the lever 4 in FIG. 1. The lever shaft 10 is, in turn, rotatably in bearings 17 in a smooth-running and clearance-free manner and, as a result of a spring (not shown) corresponding to the spring 6 in FIG. 1, it receives a torque which presses the feeler roller 3 into the grooved roller 2 with a predetermined pressing force (pressure) and in so doing it presses the sliver 1 into a shape corresponding to the cross-section of the groove. Means are advantageously provided to adjust the spring pressure. The eccentricity of the feeler roller 3 with respect to the lever shaft 10 can be achieved by designing the lever shaft as a crank.

A measuring tab 13 is carried by the end of the lever shaft 10 opposite the feeler roller 3. This measuring tab is fixed at a distance 14 below the center of the lever shaft 10 and is a metallic, preferably ferro-magnetic, rod. The measuring tab 13 is also rotatable with the rotational movements of the lever shaft 10.

The measuring tab 13 cooperates with a sensor 11 which is longitudinally carried in a track lying in the same plane as the lever shaft 10 and the axis of the feeler roller 3 and perpendicular to the lever shaft 10 when the grooved roller 2 is empty. The sensor 11 is longitudinally displaceable to adjust its position, for example, by means of a lead spindle 12 which is mounted without clearance in spindle bearings 16 and can be rotated by means of a crank 19. The position of the sensor 11 can be manually adjusted so that it is located adjacent to the intersection point of measuring tab 13 and the axis of shaft 12 corresponding to a predetermined desired value of sliver thickness with the aid of corresponding markings 20 shown in FIG. 5.

The sensor 11 preferably has a magneto-resistor 15 mounted thereon. Such element is known per se, responds to approaches of ferro-magnetic material and emits corresponding signals related to the proximity of the measuring tab 13 thereto. The magneto-resistor 15 cooperates with the measuring tab 13 because the measuring tab 13 moves past the magneto-resistor 15 when the feeler roller 3 is deflected.

Even small deflections of the feeler roller 3 produce easily measurable displacement with respect to the sensor 11 if the eccentric spacing 14 of the measuring tab 13 is suitably selected. The magneto-resistor 15 actually determines when the measuring tab 13 goes past its center. The set value for the thickness of the sliver running through the grooved roller 2 can now be reproducibly predetermined by means of the lead spindle 12. If the sensor 11 is located at the remote end of the lead spindle 12, a range for weak slivers is selected whereas a position of the sensor 11 in the vicinity of the lever shaft 10 is selected for heavy slivers. Because of this, the sensivity of the measurement of thickness is relatively constant. This means that a change of thickness of 10%, for example, triggers identical control actions both for a light sliver and for a heavy sliver. This is illustrated with reference to FIGS. 5 and 6.

FIG. 5 shows the sensor 11 with the magneto-resistor 15 at the remote end of the lead spindle 12. The measuring tab 13 encloses a small angle $\alpha_1$ with respect to the plane through the lead spindle axis. Therefore, even small changes in the angle $\alpha_1$ cause marked shifting $\Delta L$ of the point of intersection between measuring tab 13 and spindle axis 12. This corresponds to the measurement of a weak sliver with correspondingly small absolute variations of thickness.

On the other hand, the sensor 11 with magneto-resistor 15 is displaced, i.e. positioned, close to the lever shaft 10 in FIG. 6. The point of intersection between the measuring tab 13 and spindle axis 12 describes substantially smaller deflections when the angle $\alpha_2$ changes. This means that the absolute variations in thickness must also be correspondingly large in the case of heavy slivers in order to receive equal shifts $\Delta L$ of the point of intersection between measuring tab 13 and spindle axis 12.

A substantially linear equation between the amount of sliver and position of the sensor 11 can be achieved by suitable choice of the eccentricity 18 and of the eccentric distance 14. Even better proportionality can be obtained by the fact that any non-linearity still present is compensated by suitable shaping of the measuring tab 13.

The point of intersection of the measuring tab 13 with the spindle axis 12 is brought into play for defining the value of the feeler roller deflection in order to simplify the behaviour of the arrangement according to the invention. When the arrangement is used in practice as a control member, it behaves, for example, in such a way that magneto-resistor 15 emits an error signal when the measuring tab 13 is located outside its center. This error signal produces a corresponding reduction or increase in the cross-section of the sliver for the purpose of correction, depending upon its polarity.

The apparatus of the invention has one condition, for a mode of operation which is free from defect, but this condition can be fulfilled using means known to specialists. A clearance-free but smooth-running bearing of the lever shaft 10 and of the lead spindle 12 and also an accurate perpendicular orientation of the lead spindle axis relative to the lever shaft and complete parallelity between the measuring tab 13 and the track of the magneto-resistor 15 along the lead spindle 12 so that the air gap between them is constant over the entire range are particularly important.

The dependence of the signal voltage of the magneto-resistors upon the ambient temperature, which is peculiar to them, can be eliminated or at least reduced by means of suitable known compensation circuits.

The calibrated scale 20 with which the set value of the sliver cross-section is determined is advantageously completed by means of another scale whose data 21 express the relative set value correction as a function of the position and the shifting of the sensor 11 along the lead spindle 12.

What we claim is:

1. An apparatus for continuously monitoring and controlling the deviations in the cross-section of slivers, comprising a grooved roller, a feeler roller which cooperates with the grooved roller, and which is displaceable against a resistance force under the influence of a sliver located between the grooved roller and the feeler roller, a lever shaft on one end of which the feeler roller is eccentrically mounted, an eccentric measuring tab connected to the lever shaft and arranged to reproduce on a larger scale the rotational movements of the shaft, and sensor means including a sensor which lies in a plane determined by the axis of lever shaft and the axis of the feeler roller when no sliver is present for detecting the position of the measuring tab with respect to said plane without contact with said measuring tab.

2. An apparatus according to claim 1, wherein the sensor is displaceable along a track which is perpendicular to the lever shaft and lies in the same plane as the axis of the feeler roller when no sliver is present between the grooved roller and the feeler roller, whereby the sensor can be moved to a predetermined position in the region of the measuring tab.

3. An apparatus according to claim 1 or 2, wherein the sensor is a magnetic-resistor and the measuring tab is made of a magnetically conductive material and can be moved past the magneto-resistor with a constant air gap.

4. An apparatus according to claim 3, wherein the magneto-resistor can be displaced on guide members in the form of a slide, and including a lead spindle coupled to said sensor for effecting displacement thereof.

5. An apparatus according to claim 4, wherein the lead spindle has a calibrated scale for adjusting the set value of the sliver to be measured and to be controlled.

6. An apparatus according to claim 5, wherein the calibrated scale for adjusting the set value includes data which represents the relative deviation in cross-section from its mean value as a function of the position and the shifting of the sensor.

7. A method of continuously monitoring and controlling the deviations in the cross-section of textile slivers with respect to a preselected set value, using a grooved roller and a feeler roller which cooperates with the grooved roller to pass the sliver therebetween, comprising the steps of displacing the feeler roller under the influence of the cross-section of the sliver against a resistance force, converting changes in the position of the feeler roller into a rotational movement of a lever shaft, effecting proportional movement of a measuring tab in accordance with movement of the lever shaft, detecting deviation of the measuring tab from a selected position representing said preselected set value without contact therewith by means of a sensor, converting said deviations from the set value of the sliver cross-section into proportional electrical error signals, and controlling the cross-section of the sliver in accordance with said error signals to maintain said set value.

8. A method according to claim 7, further including adjusting the set value of the sliver cross-section by shifting the sensor to a preselected position along a track which is perpendicular to the lever shaft and lies in the same plane as the shaft and the axis of the feeler roller when no sliver is present.

9. A method according to claim 7 or 8, wherein the sensor is a magneto-resistor having substantially zero input power consumption and the measuring tab is formed of a magnetically-conductive material.

10. An apparatus according to claim 1 wherein the measuring tab is arranged eccentrically with respect to the lever shaft, the eccentricity being such that when the measuring tab is deflected within a selected control region, it moves in the proportionality region of the sensor so that a predetermined sensitivity for the sliver to be measured or to be controlled is at least approximately constant over the entire numerical range.

11. An apparatus according to claim 1, further including means responsive to said error means for controlling the cross-section of the sliver in such a way that the deviations in the cross-section from a preselected set value can be eliminated.

* * * * *